United States Patent
Perumalla et al.

(10) Patent No.: US 10,587,632 B1
(45) Date of Patent: Mar. 10, 2020

(54) NEURAL NETWORK-BASED MALWARE DETECTION

(71) Applicant: Amazon Technologies, Inc., Seattle, WA (US)

(72) Inventors: Poorna Chand Srinivas Perumalla, Seattle, WA (US); Pracheer Gupta, Stanford, CA (US); Madan Mohan Rao Jampani, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 15/718,770

(22) Filed: Sep. 28, 2017

(51) Int. Cl.
*H04L 29/06* (2006.01)
*G06N 3/08* (2006.01)

(52) U.S. Cl.
CPC .......... *H04L 63/1416* (2013.01); *G06N 3/08* (2013.01); *H04L 63/1425* (2013.01)

(58) Field of Classification Search
CPC .... H04L 63/1416; H04L 63/1425; G06N 3/08
See application file for complete search history.

(56) References Cited

U.S. PATENT DOCUMENTS

| | | | | |
|---|---|---|---|---|
| 2007/0192863 A1* | 8/2007 | Kapoor | ................... | G06F 9/505 726/23 |
| 2008/0229415 A1* | 9/2008 | Kapoor | ................... | G06F 21/55 726/22 |
| 2010/0192225 A1* | 7/2010 | Ma | ........................ | G06F 21/552 726/23 |
| 2011/0302648 A1* | 12/2011 | Yoo | ........................ | G06F 21/554 726/13 |
| 2011/0314547 A1* | 12/2011 | Yoo | ........................ | G06F 21/55 726/24 |
| 2012/0255019 A1* | 10/2012 | McNamee | ............ | G06F 21/554 726/24 |
| 2016/0020968 A1* | 1/2016 | Aumann | ............... | H04L 43/062 370/252 |

* cited by examiner

*Primary Examiner* — Mohammed Waliullah
(74) *Attorney, Agent, or Firm* — Lowenstein Sandler LLP

(57) ABSTRACT

A method and system including a neural network configured to detect whether a source of the networks packets is transmitting in accordance with a recognized application protocol. The neural network analyzes a set of network packets to determine a probability that the network pattern corresponds to a network pattern associated with a recognized application protocol. If the probability associated with a first recognized application protocol exceeds a threshold probability value, the transmission of the set of network packets may be classified as being transmitted in accordance with the first recognized application protocol. If the probabilities corresponding to the respective recognized application protocols do not exceed the threshold probability value, the neural network classifies the transmission of the set of network packets as malware.

18 Claims, 5 Drawing Sheets

NEURAL NETWORK-BASED MALWARE DETECTION

BACKGROUND

In machine learning, neural networks (e.g., a Recurrent Neural Networks (RNN) or Long Short-Term Memory (LSTM) networks) are employed to analyze text strings. The neural networks may predict a next character, word, or sentence in a text string in view of previously provided characters, words, or sentences. In certain cases, the neural networks classify elements of the text string (e.g., sentences, paragraphs, etc.) into one or more categories, such as whether the input element represents a positive or negative sentiment, or whether the input refers to history, philosophy, science, sports, etc.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

Figure 1:
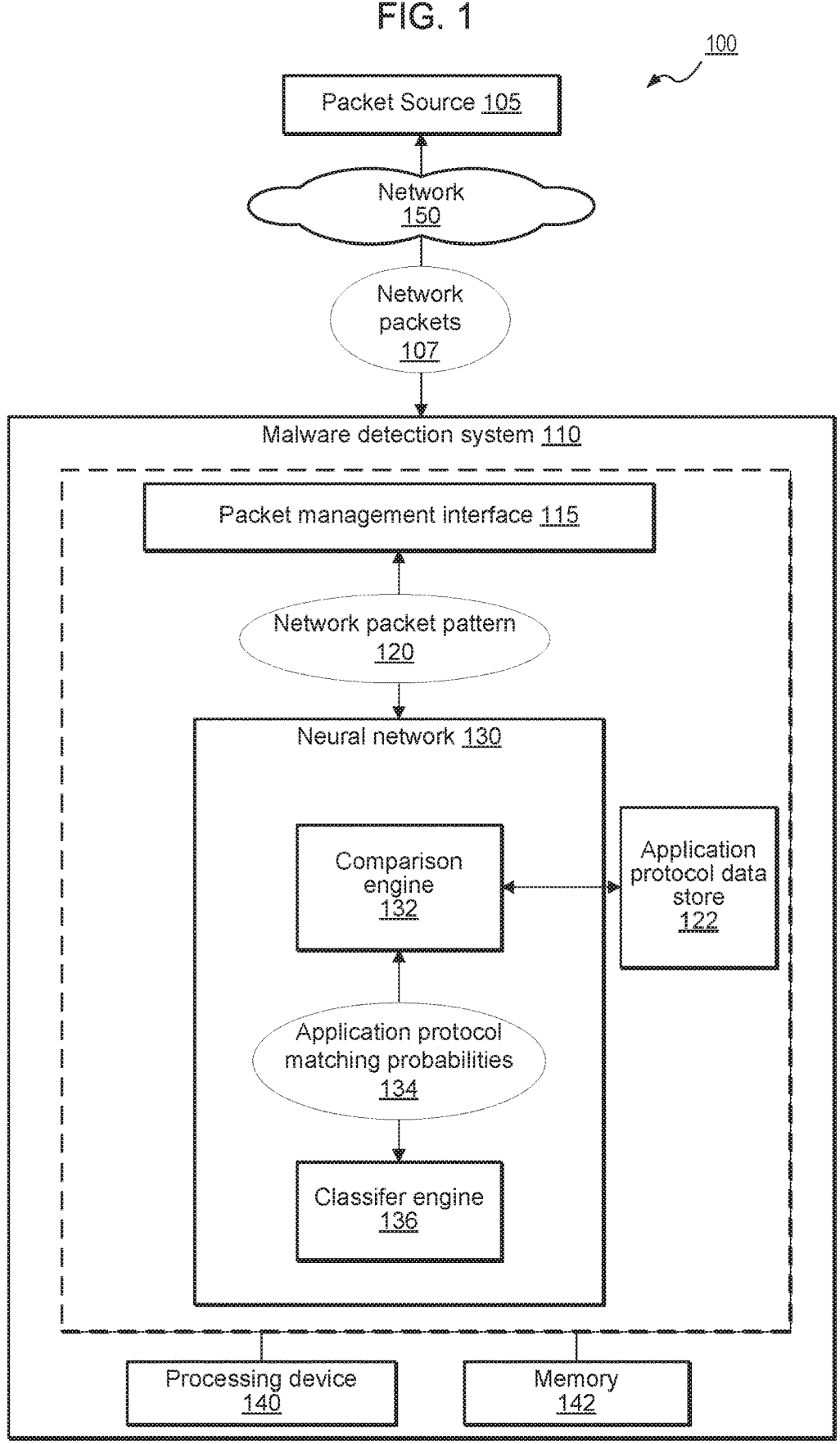
FIG. 1 illustrates an example environment including a malware detection system, according to one embodiment.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to network packet processing using a neural network configured to detect whether a source of the networks packets is transmitting in accordance with a recognized application protocol (e.g., hypertext transfer protocol (HTTP), file transfer protocol (FTP), simple mail transfer protocol (SMTP), telnet, secure shell (ssh) protocol, etc.). In one embodiment, a malware detection system includes a neural network configured to analyze a set of network packets to determine a probability that the network pattern corresponds to a network pattern associated with a recognized application protocol (also referred to as an "application protocol matching probability"). In one embodiment, if the probability (also referred to as a "confidence score") associated with a first recognized application protocol exceeds a threshold probability value, the transmission of the set of network packets may be classified as being transmitted in accordance with the first recognized application protocol. In one embodiment, if the probabilities corresponding to the respective recognized application protocols do not exceed the threshold probability value, the neural network classifies the transmission of the set of network packets as malware.

In one embodiment, the neural network is an artificial neural network with multiple layers of units between an input layer and an output layer. In one embodiment, the neural network is trained to enable the classification of network traffic as being transmitted in accordance with one or more recognized application protocols. The trained neural network receives a new incoming network traffic pattern and predicts an application protocol associated with the transmission of the network traffic. In one embodiment, the neural network determines a respective probability that the new incoming network traffic is being transmitted in accordance with each of the recognized application protocols. In one embodiment, if the probability scores for the respective recognized application protocols do not exceed a threshold value, the neural network determines the transmission is based on an unrecognized application protocol, and classifies the network traffic as malware. In one embodiment, a comparison is made between the network traffic pattern associated with a new incoming flow of packets and multiple network traffic patterns corresponding to respective application protocols that the neural network has been trained to identify. In one embodiment, the neural network is trained during a training phase wherein the neural network determines a packet pattern (e.g., a pattern representing a flow or exchange of packets corresponding to a recognized application protocol) corresponding to each of recognized application protocols based on the collection and analysis of a training dataset (e.g., including historical network data). In one embodiment, any suitable neural network model may be employed, such as, for example, a RNN model, LSTM neural network model, a k-Nearest Neighbor (KNN) model, etc. In one embodiment, the neural network receives as an input one or more packet flows (e.g., a packet flow from a client server application or a quantity of packet flows from a peer-to-peer (p2p) application (e.g., BitTorrent).

In one embodiment, the neural network reads and analyzes the input stream (e.g., uni-direction flow of bytes or bi-directional flow of bytes) and encodes the set of network packets into a network pattern (e.g., a high-dimensional embedding or encoding). In one embodiment, the input to the neural network of the malware detection system is a fixed set of bytes or a continuous stream of bytes. In one embodiment, the malware detection system is configured to collect bytes of a continuous stream until the neural network captures a sufficient level of information to make the embedding determination. In one embodiment, the embedding or encoding determination is used to classify whether the packet flow belongs to a recognized application protocol or to malware. In one embodiment, a suitable classification algorithm may be employed, such as a KNN classification algorithm. In one embodiment, the malware detection system determines a probability that a packet flow belongs to a recognized application protocol or malware.

FIG. 1 is a block diagram illustrating an example environment 100 including a malware detection system 110, according to one embodiment. In one embodiment, the malware detection system 110 includes a neural network 130 trained to determine if network packets 107 received from a packet source 105 via a network 150 are classified as a transmission in accordance with one or more known or recognized application protocols.

In one embodiment, the malware detection system 110 includes a packet management interface 115, the neural network 130 and an application protocol data store 122. In one embodiment, the neural network 130 includes a comparison engine 132 and a classifier engine 136. In one embodiment, the malware detection system 110 includes a processing device 140 and a memory 142 configured to execute and store instructions associated with the functionality of the various components, services, and modules of the malware detection system 110, as described in greater detail below in connection with FIGS. 2-5.

In one embodiment, the packet management interface 115 of the malware detection system 110 receives a set of network packets 107 from a packet source 105 via the network 150. In one embodiment, the network 150 may be any suitable network type including, for example, the Internet, intranets, extranets, wide area networks (WANs), local area networks (LANs), wired networks, wireless networks, or other suitable networks, etc., or any combination of two or more such networks.

In one embodiment, the packet source 105 may be an application or malware operating in a client-server environment or a peer-to-peer computing environment. In one embodiment, the malware detection system 110 may be hosted by a server in a client-server environment or a peer computing system in a peer-to-peer computing environment. In one embodiment, the network packets 107 may be transmitted by the packet source 105 according to an application protocol.

In one embodiment, the packet management interface 115 receives the input set of network packets 107 (e.g., one or more packet flows in a uni-directional or bi-directional arrangement) and determines a corresponding network packet pattern 120. In one embodiment, the packet management interface 115 may determine a network packet pattern 120 based on the actual network traffic for the one or more packet flows or an aggregation over multiple packet flows. In one embodiment, the packet management interface 115 may represent the aggregation using an input vector representation including a quantity of outgoing (and/or incoming) bytes per unit of time for multiple consecutive time slots (e.g., one second time slots). In one embodiment, the packet management interface 115 may represent the aggregation using an input vector representation including a set of pairs of elements, wherein each pair of elements includes a quantity of outgoing bytes in a given interval (e.g., a second) and the second element includes a quantity of outgoing bytes in the same interval. In one embodiment, the packet management interface 115 generates the network packet pattern 120 including an input vector including pairs of elements representing a consecutive span of time (e.g., seconds, minutes, hours, days, etc.) and provides the network packet pattern to the neural network 130. In one embodiment, the packet management interface 115 may be a component of the neural network 130, such that the functionality performed by the packet management system 115 (e.g., the identification of the network packet pattern 120) may be part of the functionality of the neural network 130). In one embodiment, the packet management interface 115 is part of the neural network 130 trained to identify the network packet pattern 120 for provisioning as an input to the comparison engine 132 of the neural network 130.

In one embodiment, the neural network 130 includes the comparison engine 132 configured to compare the network packet pattern 107 with patterns associated with recognized application protocols. In one embodiment, example neural networks may include, but are not limited to, recurrent neural networks, long short-term memory neural networks, convolutional neural networks, region-based convolutional neural networks, deep neural networks, etc. In one embodiment, as a result of a period of training, application protocol data is stored in an application protocol data store 122. Training may be performed using a training dataset of network patterns of network protocols, where each network pattern in the training dataset may be labeled with a network protocol associated with that network pattern. In one embodiment, the application protocol data store includes information associated with network packet patterns modeled for multiple different application protocols. For example, the application protocol data store 122 may include network packet pattern information for a first recognized application protocol (e.g., HTTP), a second application protocol (e.g., FTP), a third recognized application protocol (e.g., SMTP), etc.

In one embodiment, the comparison engine 132 may have access to modeling information corresponding to any suitable number and type of application protocols (also referred to as the "recognized application protocols"). In one embodiment, based on a comparison of the network packet pattern of the network packets 107, the comparison engine 132 generates an application protocol matching probability for each of the respective recognized application protocols. For example, the comparison engine 132 generates a first application protocol matching probability 134A indicating a likelihood (e.g., represented as a percentage (e.g., out of 100%) or value on a scale (e.g., 1 to 100)) that the network packet pattern 120 matches a first recognized application protocol. In this example, the comparison engine 132 generates a second application protocol matching probability 134B indicating a likelihood that the network packet pattern 120 matches a second recognized application protocol. In one embodiment, a corresponding application protocol matching probability 134A-N is determined by the comparison engine 132 for each of the respective recognized application protocols. In one embodiment, the comparison engine 132 includes a set of instructions, that when executed by a processing device (e.g., processing device 140) perform the functionality described above.

In one embodiment, the classifier engine 136 of the neural network 130 receives the application protocol matching probabilities 134A-N corresponding to the respective recognized application protocols. In one embodiment, the classifier engine 136 analyzes the probabilities 134A-N to determine a classification for the network packets 107. In one embodiment, classification includes determining which application protocol has been employed for the transmission of the network packets 107.

In one embodiment, the classifier engine 136 compares the application protocol matching probabilities to a threshold value (also referred to as a "threshold probability value"). In one embodiment, if it is determined that an application protocol matching probability 134 exceeds the threshold value, the classifier engine 136 may classify the network packets 107 as belonging to the corresponding application protocol. For example, if a first application protocol matching probability of multiple application protocol probabilities exceeds the threshold value, the network packets 107 are determined to be transmitted in accordance with the first recognized application protocol.

In one embodiment, if none of the application protocol matching probabilities exceed the threshold value, the classifier engine 136 may classify the network packets as originating from malicious software or malware (e.g., the packet source 105 is identified as malware). In one embodiment, if it is determined that the network packets 107 and corresponding network packet pattern 120 do not match any of the recognized application protocols, then the classifier engine 136 predicts or classifies the network packets as malware. In one embodiment, the malware detection system 110 may send a notification relating to the classification of the network packets 107 as malware, may terminate the transmission of the network packets 107, or both.

In one embodiment, the neural network 130 may be implemented using a central processing unit (CPU), such as processing device 140. In one embodiment, the neural network 130 is a set of instructions stored in memory 142 and executable by the processing device 140. In one embodiment, the neural network 130 may be implemented as dedicated hardware components (e.g., a deep learning processor using GPUs or Application-specific Integrated Circuits (ASICs). In one embodiment, the malware detection system 110 and neural network 130 are configured to perform the functionality described above and with regard to FIGS. 2-5.

Figure 2:
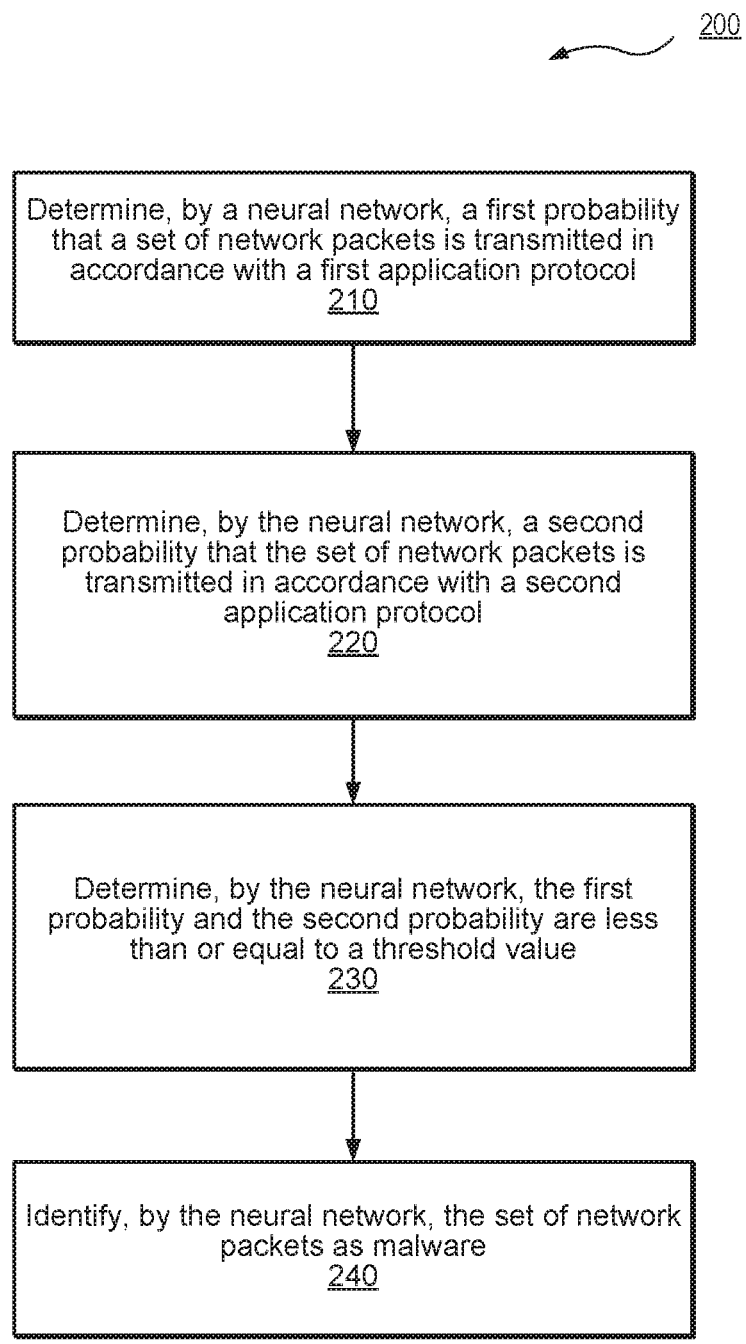
FIG. 2 is a flow diagram illustrating an example method of malware detection processing, according to one embodiment.

FIG. 2 illustrates a flowchart that provides an example of a process 200 executed by a malware detection system including a neural network (e.g., neural network 130 of FIG. 1), according to various embodiments. It is understood that the flowchart of FIG. 2 provides an example of the many different types of functional arrangements that may be employed to implement the operation of the malware detection system described herein. Process 200 may be performed by a processing logic that may comprise hardware (e.g., circuitry, dedicated logic, programmable logic, microcode, etc.), software (e.g., instructions run on a processing device), or a combination thereof.

In block 210, a neural network determines a first probability that a set of network packets is being transmitted in accordance with a first application protocol. In one embodiment, the first probability (e.g., a first application protocol matching probability) is determined by comparing a network pattern corresponding to the set of network packets to a network pattern corresponding to the first application protocol. In one embodiment, the neural network is trained to model the first application protocol to determine the corresponding packet pattern. In one embodiment, a vector representation of the network pattern of the set of network packets is generated. In one embodiment, vector analysis is performed to compare the network pattern of the set of network packets originating from a packet source (e.g., a recognized application or malware) with a vector representation corresponding to the first application protocol. For example, the first probability (representing a likelihood that the pattern corresponding to the set of network packets is the same as a pattern corresponding to the first application protocol) may be 45%.

In block 220, the neural network determines a second probability that the set of network packets is being transmitted in accordance with a second application protocol. In one embodiment, the second probability (e.g., a second application protocol matching probability) is determined by comparing the network pattern corresponding to the set of network packets to a network pattern corresponding to the second application protocol. In one embodiment, the neural network is trained to model the second application protocol to determine a packet pattern corresponding with that application protocol. In one embodiment, a vector representation of the network pattern of the set of network packets is generated. In one embodiment, vector analysis is performed to compare the network pattern of the set of network packets originating from a packet source (e.g., a recognized application or malware) with a vector representation corresponding to the second application protocol. For example, the second probability (representing a likelihood that the pattern corresponding to the set of network packets is the same as a pattern corresponding to the second application protocol) may be 38%.

In block 230, the neural network determines the first probability and the second probability are less than or equal to a threshold value. In one embodiment, the threshold value represents a degree of probability that the set of network packets are to be classified in accordance with a corresponding application protocol. In one embodiment, if a probability (e.g., the first probability, the second probability or both) is less than or equal to the threshold value, then the neural network determines that the set of network packets are not to be classified as belonging to corresponding application protocol. Continuing the example above, the neural network may apply a threshold value of 48%. In this example, the neural network assigns a high level of confidence to a probability that exceeds the threshold value (e.g., is higher than 48%) for purposes of classifying the set of network packets as being transmitted according to an application protocol. In this example, both the first probability (i.e., 45%) and the second probability (i.e., 38%).

In block 240, upon determining that the first probability and the second probability are each less than the threshold value (i.e., indicating a low level of confidence that there is a match between a pattern associated with the set of network packets and a recognized application protocol), the neural network classifies the set of network packets as malware (i.e., as being transmitted in accordance with an unrecognized application protocol). Advantageously, the neural network is trained to identify a recognized application protocol matching a current set of network packets. If no such match is identified, the neural network may classify or predict that the set of network packets are being transmitted by malware, and execute a remedial action (e.g., generate an alert, cause termination of the transmission of the set of packets, block or prevent receipt of the set of networks by a destination system.

Figure 3:
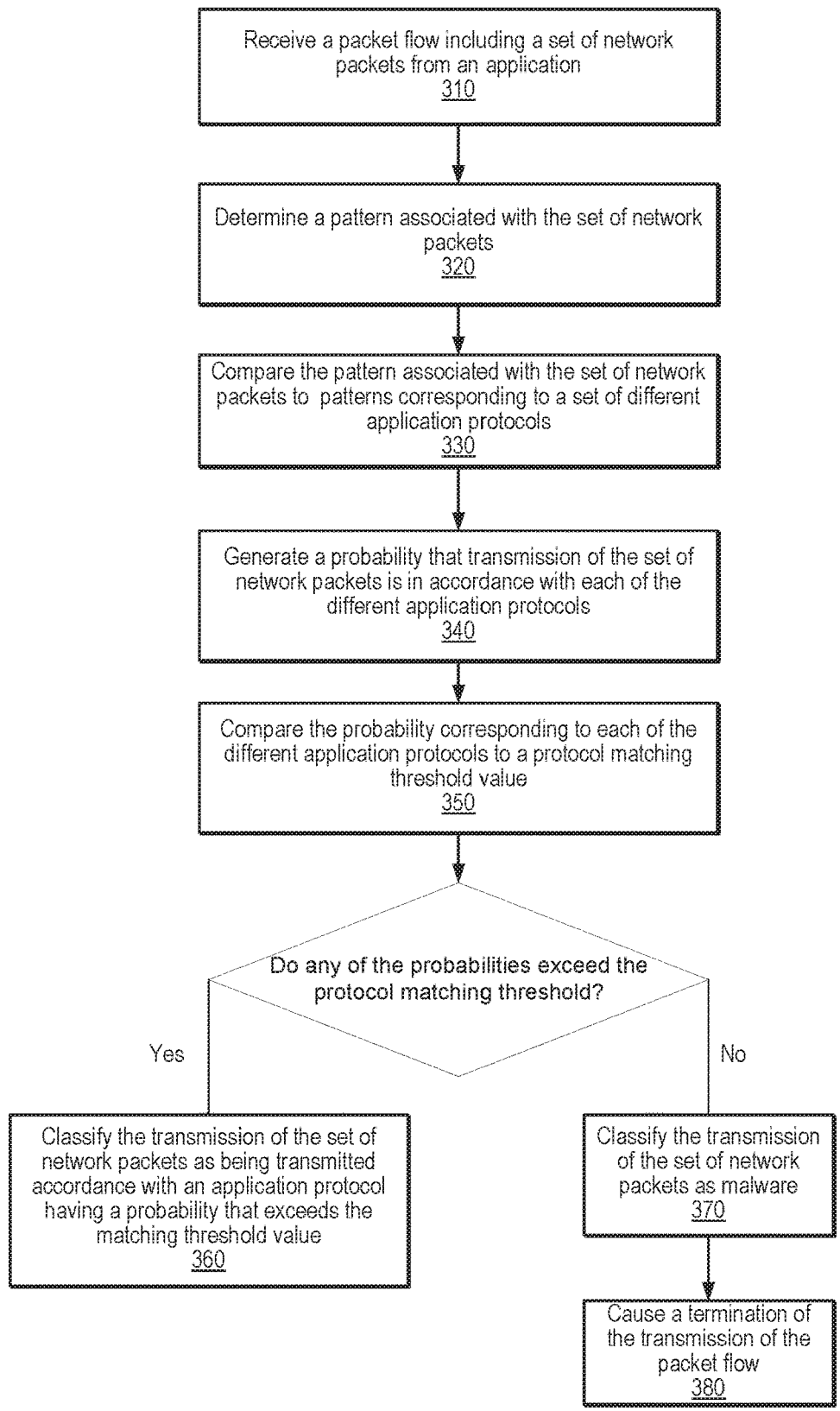
FIG. 3 is a flow diagram illustrating an example method of malware detection processing, according to one embodiment.

FIG. 3 illustrates a flowchart that provides an example of a process 300 executed by a malware detection system including a neural network (e.g., neural network 130 of FIG. 1), according to various embodiments. In block 310, one or more packet flows are received by the malware detection system from a packet flow source. In one embodiment, the one or more packet flows include a set of network packets being transmitted via a network by the packet source (e.g., a client-server application, a p2p application, malware, etc.) In one embodiment, the packet flow may be a fixed stream of bytes or a continuous stream of bytes that are collected until the neural network reaches a point wherein a sufficient level of data has been collected to determine a pattern (as describe below).

In block 320, a pattern associated with the set of network packets is identified. In one embodiment, the set of input packets are read by the neural network and encode a pattern corresponding to the network packets. In one embodiment, the neural network may encode the pattern into a high dimensional embedding or encoding, wherein the pattern is represented by a multi-dimensional vector representation. In one embodiment, the input to the neural network may be the actual network traffic (e.g., the packets of one or more packet flows) or an aggregation over multiple packet flows. In one embodiment, the aggregation may be represented by a vector including a quantity of outgoing bytes (and/or incoming bytes) per unit of time (e.g., one second) for multiple consecutive time slots.

In one embodiment, the aggregation may be represented by a vector representation including a set of pairs of elements, wherein each pair of elements includes a quantity of outgoing bytes in a given time instance (e.g., a first second of time) as a first element and a quantity of incoming bytes in the same time instance (e.g., the first second of time). In one embodiment, the input vector analyzed by the neural network is formed by pairs of elements representing a consecutive span or period of time (e.g., seconds, minutes, hours, days, etc.).

In block 330, the pattern associated with the set of network packets is compared to patterns corresponding to multiple recognized application protocols. In one embodiment, the pattern corresponding to each of the recognized application protocols may be learned (i.e., identified) by the neural network during a training stage using suitable machining learning processing. In one embodiment, the recognized application protocol patterns are encoded as multi-dimensional vector representations.

In block 340, a probability is generated based on the comparison of the pattern associated with the set of network packets and the pattern corresponding to each of the recognized application protocols. In one example, a first probability is generated that represents a calculated likelihood that the packet pattern matches a first pattern corresponding to a first application protocol. For example, a probability (e.g., a confidence score) of 0.6 may be generated (e.g., on a scale of 0 to 1.0, wherein a score of 1.0 represents a high level of matching between the patterns). In one embodiment, probabilities are calculated for each of the respective recognized application protocols.

In block 350, each of the generated probabilities are compared to a protocol matching threshold value. In one embodiment, the protocol matching threshold value is set to a value that represents a level of confidence that the patterns being compared are a match. For example, the protocol matching threshold value may be set to 0.7, indicating that a match is identified for a probability that is higher than the 0.7 threshold value.

If it is determined that a probability exceeds the protocol matching threshold, the process proceeds to block 360. In block 360, the transmission of the set of network packets is classified as being transmitted in accordance with the application protocol having the probability that exceeds the protocol matching threshold value. If, after calculating the multiple probabilities, it is determined that those probabilities do not exceed the protocol matching threshold value, the process proceeds to block 370. In block 370, the neural network classifies the transmission of the set of network packets as malware. In block 380, the malware detection system takes a remedial action in response to the malware classification of the set of network packets. In one embodiment, the remedial action may be termination of the transmission of the set of packets, generation of an alert or notification, prevention of the delivery of the network packets, etc.

Figure 4:
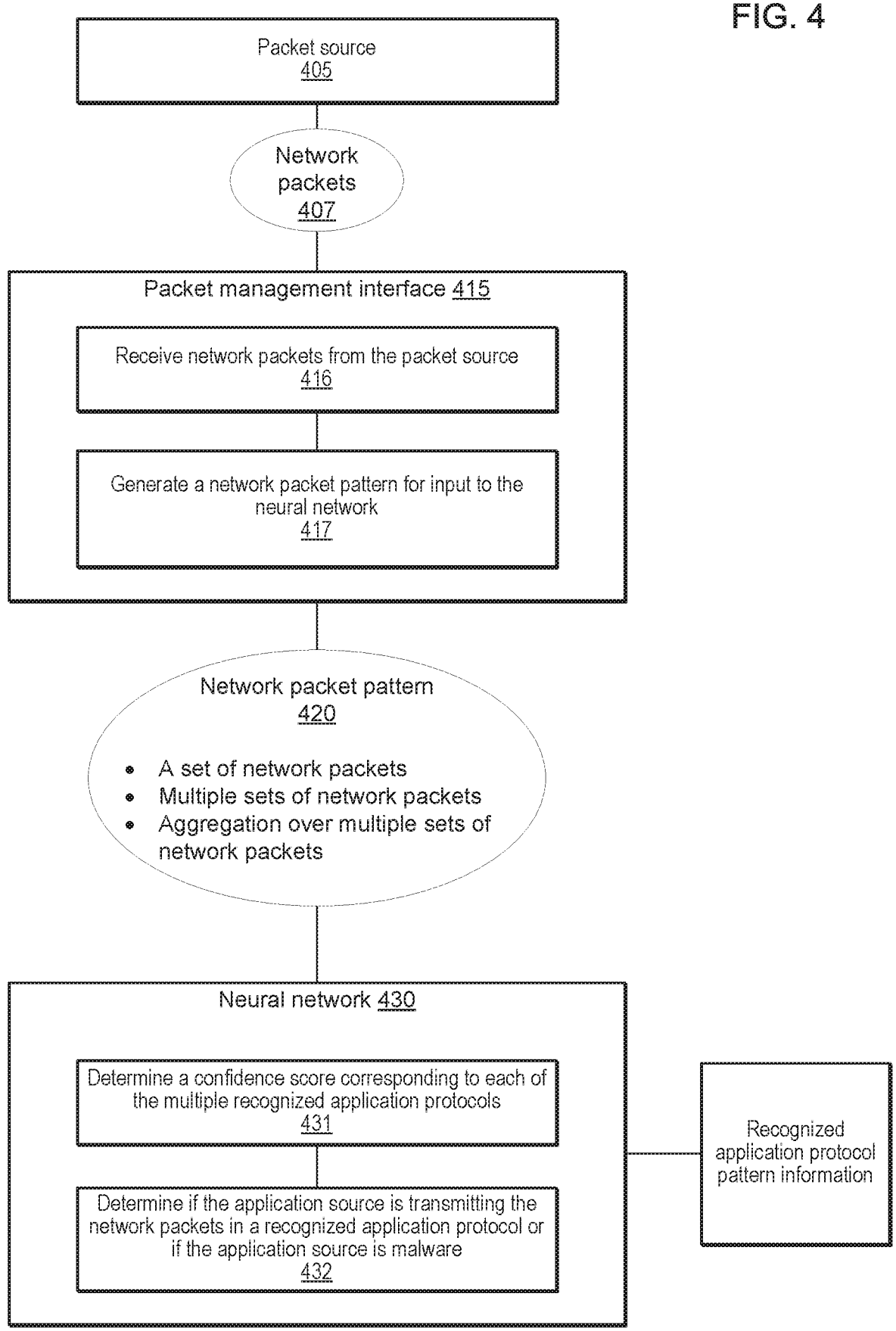
FIG. 4 illustrates exemplary sets of operations of a malware detection system, according to one embodiment.

FIG. 4 illustrates components of a malware detection system, according to various embodiments. It is understood that the flowchart of FIG. 4 provides an example of the many different types of functional arrangements that may be employed to implement the operation of the neural network 120 as described herein. The processes depicted may be performed by a processing logic that may comprise hardware (e.g., circuitry, dedicated logic, programmable logic, microcode, etc.), software (e.g., instructions run on a processing device), or a combination thereof. In one embodiment, the malware detection system includes a packet management interface 415 and neural network 430 configured to determine whether network packets 407 are being transmitted in accordance with a recognized application protocol or originating from malware.

In one embodiment, in block 416, a packet management interface 415 identifies network packets 407 originating from a packet source 405. Although illustrated as two logically separate components, it is noted that the packet management interface 415 may be part of the neural network 430. In block 417, the packet management interface 415 generates a network packet pattern for input to the neural network 430.

In one embodiment, the network packet pattern 420 includes a representation of the network packets 407. In one embodiment, the network packet pattern 420 may include a set of network packets, multiple sets of network packets (e.g., bidirectional packet flows), or an aggregation over multiples sets of network packets, as described in detail above.

In one embodiment, the network packet pattern 420 is provided as an input to the neural network 430 trained to identify multiple recognized application protocol patterns. In one embodiment, the neural network 430 maintains a data store including recognized application protocol pattern information relating to the multiple different recognized application protocols (e.g., HTTP, FTP, SMTP, telnet, ssh, etc.).

In block 431, the neural network 430 determines a probability or confidence score corresponding to each of the multiple recognized application protocols. In one embodiment, the probability is determined based on a comparison of the network packet pattern 420 and each of the recognized application protocols. In one embodiment, the probability represents a measure or likelihood that the network packet pattern 420 of the network packets 407 (e.g., the packets currently or recently transmitted by the packet source 405) are using a recognized application protocol. In one embodiment, a data structure is generated which includes each of the application protocols and the corresponding confidence score.

In block 432, the neural network 430 determines if the application source is transmitting the network packets 407 in a recognized application protocol or if the application source is malware. In one embodiment, the probability or confidence score representing a degree of matching between a recognized application protocol and the network packet pattern 420 is compared to a protocol matching threshold. In one embodiment, if the probability representing the match exceeds the protocol matching threshold value, it is determined that the network packets 407 are being transmitted in accordance with that application protocol. In one embodiment, if the confidence score associated with multiple different application protocols exceeds the protocol matching threshold value, the neural network 430 may classify the network packets 407 as belonging to an application protocol having the higher relative probability value. In one embodiment, the neural network 430 generates a ranked list of the application protocols ordered by their respective confidence scores (e.g., from highest confidence score to lowest confidence score). In one embodiment, if the respective confidence scores corresponding to the recognized application protocols do not exceed the protocol matching threshold value, the neural network 430 determines that the network packets are being transmitted in accordance with an unrecognized application protocol, and are classified as originating from malware.

Figure 5:
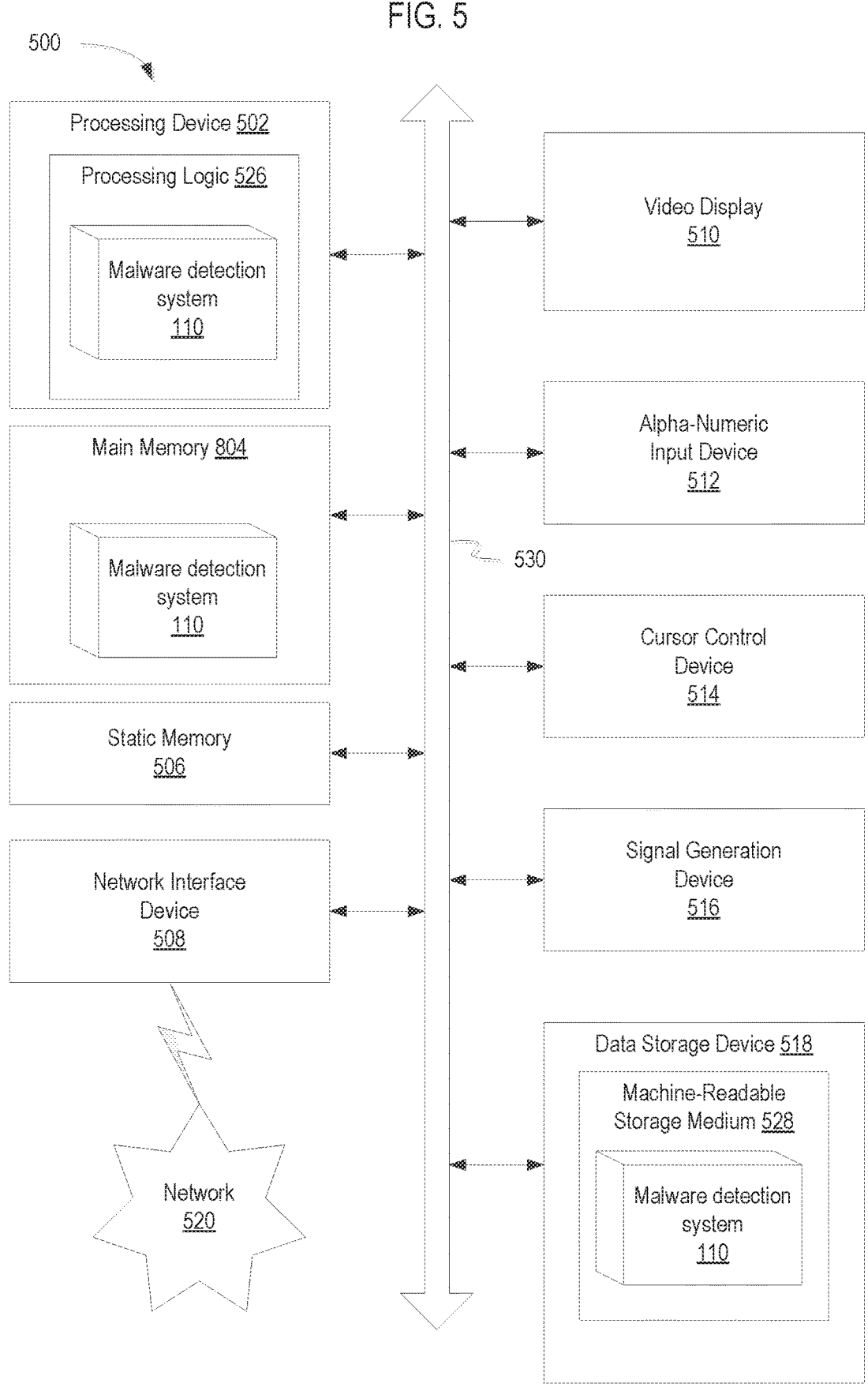
FIG. 5 is a schematic block diagram that provides an example illustration of a computing environment executing instructions relating to a neural network, according to one embodiment.

FIG. 5 illustrates a diagrammatic representation of a machine in the example form of a computer system 500 including a set of instructions executable by a malware detection system 110 including a neural network to cause the system to perform any one or more of the methodologies discussed herein. In one embodiment, the neural network may include instructions to enable execution of the processes and corresponding components shown and described in connection with FIGS. 1-5.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions for the malware detection system 110 for performing the operations and processes described herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions of the malware detection system 110 embodying any one or more of the methodologies or functions described herein. The instructions may also reside, completely or at least partially, within the main memory 504 and/or within processing logic 526 of the processing device 502 during execution thereof by the computer system 500, the main memory 504 and the processing device 502 also constituting computer-readable media.

The instructions may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "receiving", "comparing", "generating", "classifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
identifying, by a neural network executed by a processing device, a network packet pattern associated with a set of network packets transmitted by a packet source, wherein the network packet pattern comprising a plurality of data pairs, and wherein each of the plurality of data pairs comprises a first element indicating a first quantity of outgoing bytes in an interval of time and a second element indicating a second quantity of incoming bytes in the interval of time;
determining, by the neural network, a first pattern corresponding to a first application protocol;
determining, by the neural network, a second pattern corresponding to a second application protocol;
comparing the network packet pattern to the first pattern;
determining, by the neural network, a first probability that the set of network packets is transmitted in accordance with the first application protocol;
determining, by the neural network, a second probability that the set of network packets is transmitted in accordance with the second application protocol;
determining, by the neural network, the first probability is less than or equal to a threshold value;
determining, by the neural network, the second probability is less than or equal to the threshold value; and
classifying, by the neural network, the packet source corresponding to the set of network packets as malware.

2. The method of claim 1, wherein determining the first probability comprises comparing the network packet pattern to the first pattern corresponding to the first application protocol.

3. The method of claim 1, wherein the network packet pattern comprises a vector representation corresponding to the set of network packets.

4. The method of claim 3, wherein the vector representation comprises:
a first element indicating a first quantity of outgoing bytes in an interval of time; and
a second element indicating a second quantity of incoming bytes in the interval of time.

5. The method of claim 1, wherein the neural network determines the first pattern corresponding to the first application protocol in a training phase based on a set of training data.

6. A system comprising:
a processing device to execute a neural network; and
a memory to store computer-executable instructions for the neural network that, if executed, cause the processing device to:
identify a network packet pattern associated with a set of network packets transmitted by a packet source, wherein the network packet pattern comprising a plurality of data pairs, and wherein each of the plurality of data pairs comprises a first element indicating a first quantity of outgoing bytes in an interval of time and a second element indicating a second quantity of incoming bytes in the interval of time;
determine a first pattern corresponding to a first application protocol;
determine a second pattern corresponding to a second application protocol;
compare the network packet pattern to the first pattern;
determine, by the neural network, a first probability that the set of network packets is transmitted in accordance with a first application protocol;
determine, by the neural network, a second probability that the set of network packets is transmitted in accordance with a second application protocol;
determine, by the neural network, the first probability and the second probability are less than or equal to a threshold value; and
classify, by the neural network, the set of network packets as malware.

7. The system of claim 6, the processing device to determine, during a training phase of the neural network, the first pattern corresponding to the first application protocol.

8. The system of claim 7, the processing device to determine, during the training phase of the neural network, the second pattern corresponding to the second application protocol.

9. The system of claim 8, the processing device to:
compare the network packet pattern to the second pattern.

10. The system of claim 6, wherein the network packet pattern comprises a vector representation corresponding to the set of network packets.

11. The system of claim 10, wherein the vector representation comprises the plurality of data pairs.

12. The system of claim 6, the processing device to perform a remedial action in response to classification of the set of network packets as malware.

13. The system of claim 12, wherein the remedial action comprises at least one of generating a notification of the classification of the set of network packets as malware or terminating a transmission of the set of network packets.

14. A non-transitory computer-readable storage device storing computer-executable instructions that, if executed by a processing device, cause the processing device to:
- receive, by a neural network, a set of network packets;
- identify, by the neural network, a network packet pattern associated with the set of network packets, wherein the network packet pattern comprises a vector representation of a first quantity of incoming bytes and a second quantity of outgoing bytes in an interval of time;
- identify, by the neural network, a first pattern corresponding to a first application protocol;
- identify, by the neural network, a second pattern corresponding to a second application protocol;
- calculate, by the neural network, a first probability that the network packet pattern is transmitted according to the first application protocol based on a first comparison of the network packet pattern and the first pattern;
- calculate, by the neural network, a second probability that the network packet pattern is transmitted according to the second application protocol based on a second comparison of the network packet pattern and the second pattern;
- compare, by the neural network, the first probability to a protocol matching threshold value; and
- compare, by the neural network, the second probability to the protocol matching threshold value.

15. The non-transitory computer-readable storage device of claim 14, the processing device to:
- determine the first probability exceeds the protocol matching threshold value; and
- classify the set of network packets as being transmitted according to the first application protocol.

16. The non-transitory computer-readable storage device of claim 14, the processing device to:
- determine the first probability does not exceed the protocol matching threshold value;
- determine the second probability does not exceed the protocol matching threshold value; and
- classify the set of network packets as malware.

17. The non-transitory computer-readable storage device of claim 16, the processing device to perform a remedial action in response to classification of the set of network packets as malware.

18. The non-transitory computer-readable storage device of claim 14, wherein the first pattern corresponding to the first application protocol and the second pattern corresponding to the second application protocol are determined by the neural network during a training phase based on a training dataset corresponding to the first application protocol and the second application protocol.

\* \* \* \* \*